W. H. BOWES.
MACHINE FOR POSTMARKING AND CANCELING LETTERS.
APPLICATION FILED SEPT. 7, 1918.

1,399,288.

Patented Dec. 6, 1921.

UNITED STATES PATENT OFFICE.

WALTER H. BOWES, OF GREENWICH, CONNECTICUT.

MACHINE FOR POSTMARKING AND CANCELING LETTERS.

1,399,288. Specification of Letters Patent. Patented Dec. 6, 1921.

Application filed September 7, 1918. Serial No. 253,066.

*To all whom it may concern:*

Be it known that I, WALTER H. BOWES, a subject of the King of Great Britain, residing at Greenwich, in the county of Fairfield and State of Connecticut, have invented certain new and useful Improvements in Machines for Postmarking and Canceling Letters; and I hereby declare that the following is a full, clear, and exact description thereof, reference being had to the accompanying drawings, which form part of this specification.

This invention is an improvement in machines for canceling and postmarking mail matter such as letters, cards, etc. and for marking any other similar articles; and its objects are to provide a machine which will be very simple in operation, easily regulated, and in which the path of travel of the matter from the feed to the delivery will be very short.

The invention provides an easy free running hand or power operated machine with a minimum number of parts and practically having but one member requiring adjustment under ordinary operative conditions.

The accompanying drawings illustrate one practical embodiment of the invention and I will describe the same in detail, to enable others to comprehend and use the invention, but I do not consider the invention restricted to the particular constructions of parts shown in the drawings, as these, while the best and at present preferred form known to me, may be varied within the scope of the invention, and I therefore refer to the claims following the description for summaries of the essential and novel constructions and combinations of parts for which I desire protection.

The machine as shown in brief comprises a feeding wheel or drum which also serves as an impression cylinder and is preferably mounted on a fixed bearing and is therefore unyielding; with this drum coöperates a continuously rotating printing member carrying the desired printing surfaces; such as canceling bars, and postmarking die; said printing member is preferably mounted, together with its ink supply means, upon a swinging arm which is controlled by a spring to hold the printing member yieldingly normally in printing position. A letter stop is provided which is adapted to project across the path of the letter, and which is automatically controlled by a suitable cam so as to cause the letters to pass successively, and properly spaced, past the printer. An endless belt runs around the drum and drives the stacker and co-acts with the printing member and other suitable devices to separate the letters and move them past the printing member to the stacker.

A notable feature of this machine is the very compact arrangement of the feeding, separating, and printing devices whereby all the principal operations of the machine are performed within a very short space and with a very short move of the letter from the feed to the delivery; and such compactness has been difficult to obtain; other features are the novel letter stop devices; and the novel arrangement and construction of parts which insures that all parts of the feeding belt shall be used equally for feeding purposes.

In the particular machine shown the mechanism is not article operated or controlled; but is all positively operated and timed, rendering it essentially dissimilar from other prior machines.

While the machine shown is primarily intended to be hand-operated, it can also be successfully operated by power.

In the description and claims I use the word "letter" as a descriptive term, intending thereby to include letters, cards, slips, sheets, papers, packages and other articles of such size and nature as may be safely operated upon by the machine.

I also use words "printing member" as a descriptive term intending thereby to include a member carrying any desired kind of marking surface or means whereby a letter passing through the machine can be stamped, printed, perforated or otherwise marked or manipulated on its surface during its passage through the machine.

In the accompanying drawings:—

Figure 1:
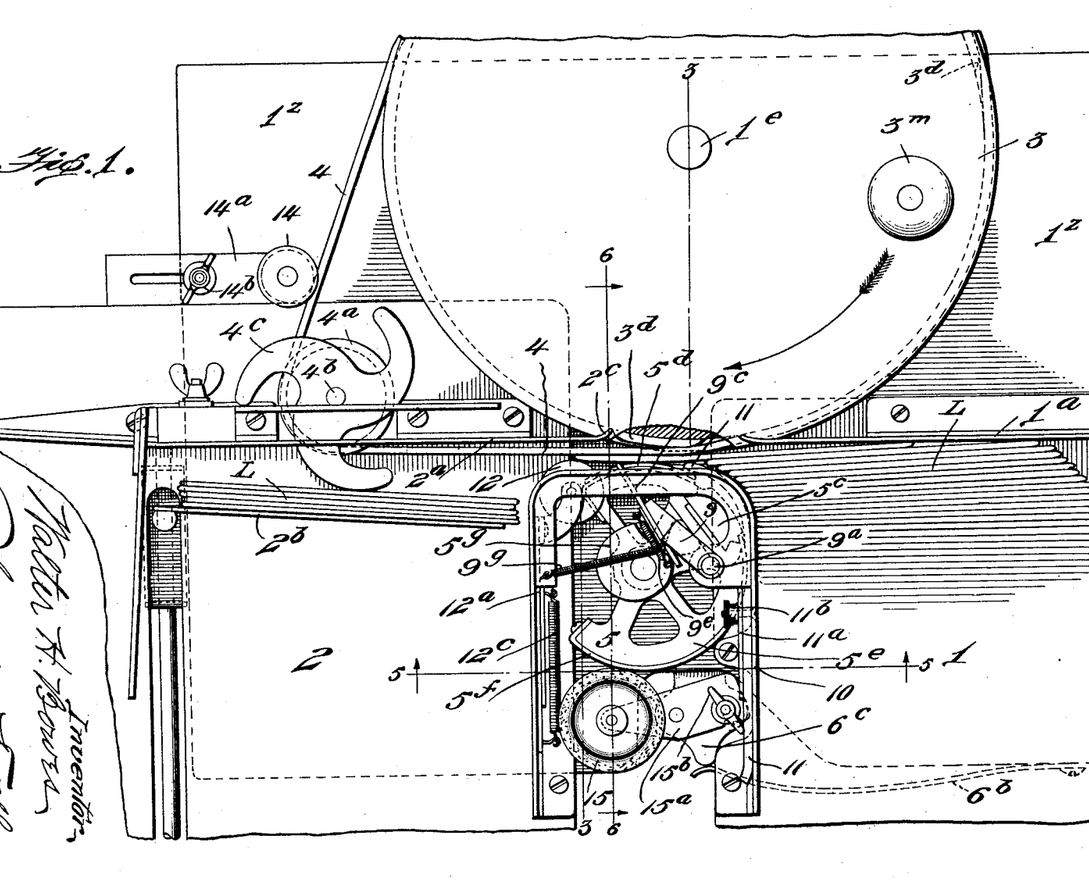
Figure 1 is a plan view of the complete machine ready for operation, some parts thereof being partly broken away, and showing a letter being printed.

The machine shown in the drawings, has a feed table 1 and a delivery table 2, which are preferably side by side or parallel, but slightly separated. The feed table has a stop $1^a$ at one end adjacent the feed wheel against which the letters to be printed or stamped are fed parallel and at right angles to the feed table as indicated in Fig. 1.

At one end of the feed and delivery tables is a feed drum 3, which is mounted on a vertical shaft $1^e$ suitably journaled or supported on the main bed plate $1^z$ of the machine. Said drum is of such diameter as to afford an easy feeding arc at the point of feed and is preferably provided with a series of shallow peripheral grooves $3^a$ opposite the printing member to allow the printing surfaces or canceling bars on such member to enter these grooves during rotation of the printing member if no letter is present. It also has a peripheral groove $3^b$ above grooves $3^a$ to receive and mask the feed belt 4; and it also has a third peripheral groove $3^c$ above groove $3^b$ for the accommodation of the letter stop. The drum may be rotated in any suitable manner. As shown it is provided with a handle $3^m$ by which it can be manually rotated; but it may be driven by a motor or power if desired.

Fastened to the drum within the groove $3^b$ at equidistant points are buttons or projections $3^d$ (three being shown) which are adapted to cause the overlying portions of the feed belt 4 to project outside of the masking groove $3^b$.

A feed belt 4 passes partially around the drum within the groove $3^b$ and then around a pulley $4^a$ on the shaft $4^b$ of a stacker $4^c$, which may be of any suitable construction and is shown as arranged at the receiving end of the delivery table 2 and which can operate through openings in an upright slotted plate $2^a$ attached to the receiving end of the delivery table 2 as usual. The belt 4 may be tightened by means of a roller 14 mounted on an adjustable support $14^a$ secured to the frame of the machine by a bolt $14^b$.

The feed belt 4 is preferably formed of a leather backing with a rubber face, and should be of such total length, with relation to the circumference of the drum 3, that at each successive revolution of the drum different portions of the belt come over and into contact with the projections $3^d$ in the groove $3^b$ so that instead of the rubber surface of this belt wearing in the same spots all the time, the whole surface or the entire length of the belt is successively used during the operations of the machine.

Directly opposite the periphery of the drum and intermediate the tables 1 and 2 is a rotatable printing member 5 attached to a shaft $5^a$ which is journaled in the end of a swinging arm 6, which is pivoted at $6^p$ to the plate $1^z$. This printing member 5 carries the printing or marking surfaces, which in the example shown consists of a printing die $5^c$, and canceling bars $5^d$, which may be removably attached to the member in any suitable manner. The die and canceling bars are curved on arcs of a circle corresponding to the greatest circumference of the member 5. Beneath the die and canceling bars the member 5 has a segmental flange $5^e$, which is preferably faced with a leather or frictional surface $5^f$ and co-acts with the belt to continue forwarding the letter after the die and canceling bars have ceased to print thereon.

The lower end of the shaft $5^a$, on which the printing member 5 is mounted, is preferably connected by a universal-joint member $7^b$ to the hub of a small pinion 7 journaled on a stud $7^c$ mounted on a supporting plate $1^a$ attached to any convenient part of the machine frame. Pinion 7 meshes with a large gear 8 which is keyed to the lower end of the shaft $1^e$ to which the drum 3 is attached, so that, through the described gearing, the member 5 carrying the die is rotated in proper time and relation to the drum.

The printing member 5 carrying the printing devices is yieldingly pressed toward the drum by suitable spring means; a spring $6^b$ being shown engaging a lateral extension $6^c$ of the arm 6; so that the printing member can yield to accommodate the letters of different thicknesses passing between the printing member and drum. On the upper end of member 5 or its shaft is mounted a cam-shaped piece $5^g$ which revolves with the head and controls the action of the letter stop or regulator.

The printing surfaces $5^d$ and $5^c$ during rotation of the printing member enter the grooves $3^a$ in the drum 3, if no letter is present, and are at no time in actual metallic contact with it; and this prevents any offset on the drum and consequent offset imprint on the backs of the letters.

The letter stop as shown comprises a bent arm 9 which is pivoted upon a stud $9^a$, attached to an adjacent fixed support such as a plate or housing 10 arranged intermediate the tables 1 and 2, adjacent the drum 3, and protecting the printing member and stop mechanism. The inner end of this arm 9 extends downwardly into the path of the cam $5^g$, and to the inner end of the arm and above the cam is attached a slidable stop $9^c$ which is shown as a slide guided in a grooved part 9$^b$ of the arm and normally projected outwardly, or toward the drum by means of a spring 9$^e$ which is arranged to project the end of the stop 9$^c$ into the groove 3$^c$ of the drum so that this stop, when in normal position as in Fig. 2, will prevent the passage of a letter on the feed table 1 past the drum and printer to the delivery table 2.

Figure 2:
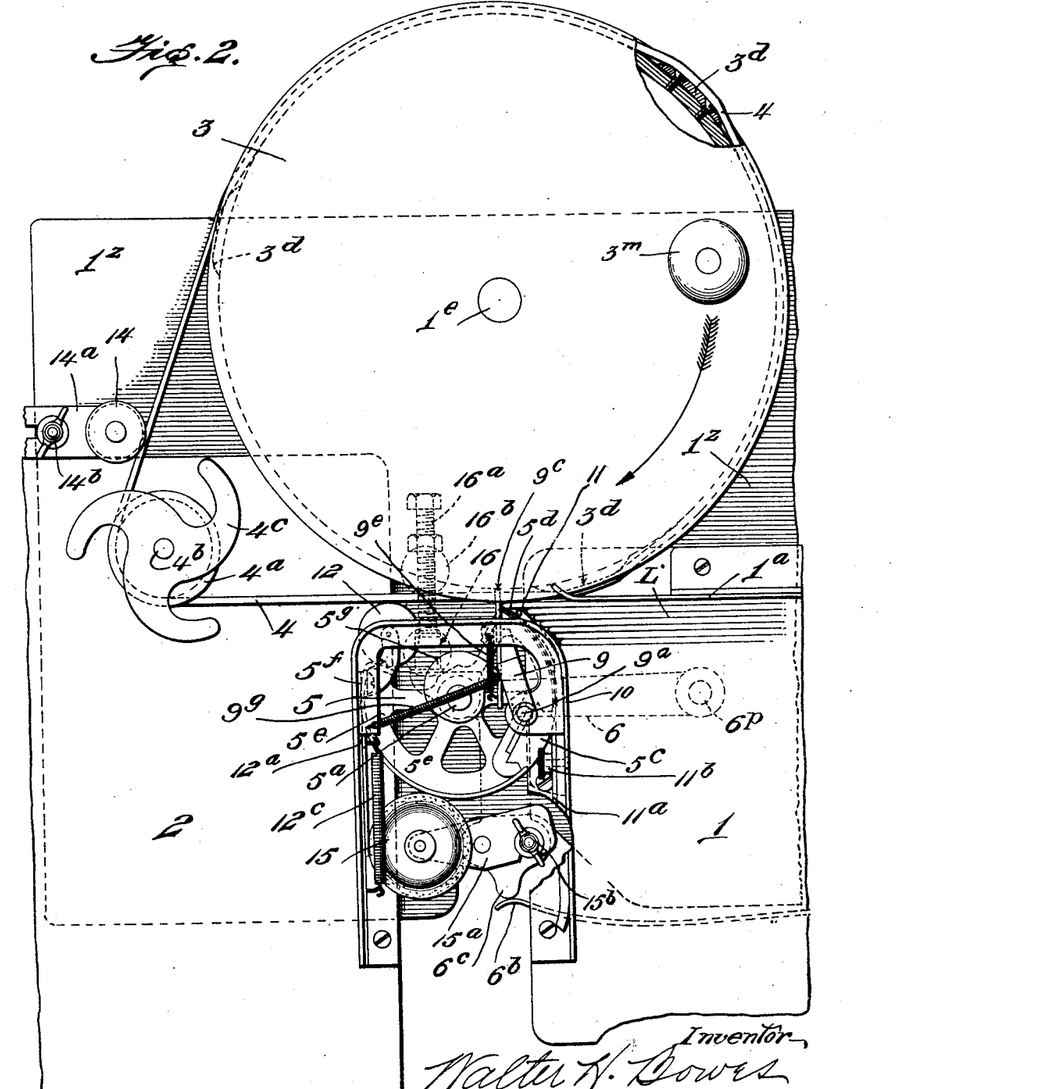
Fig. 2 is a similar view, with some parts removed, showing the printing member in non-printing position but ready to print.
Figures 3, 4:
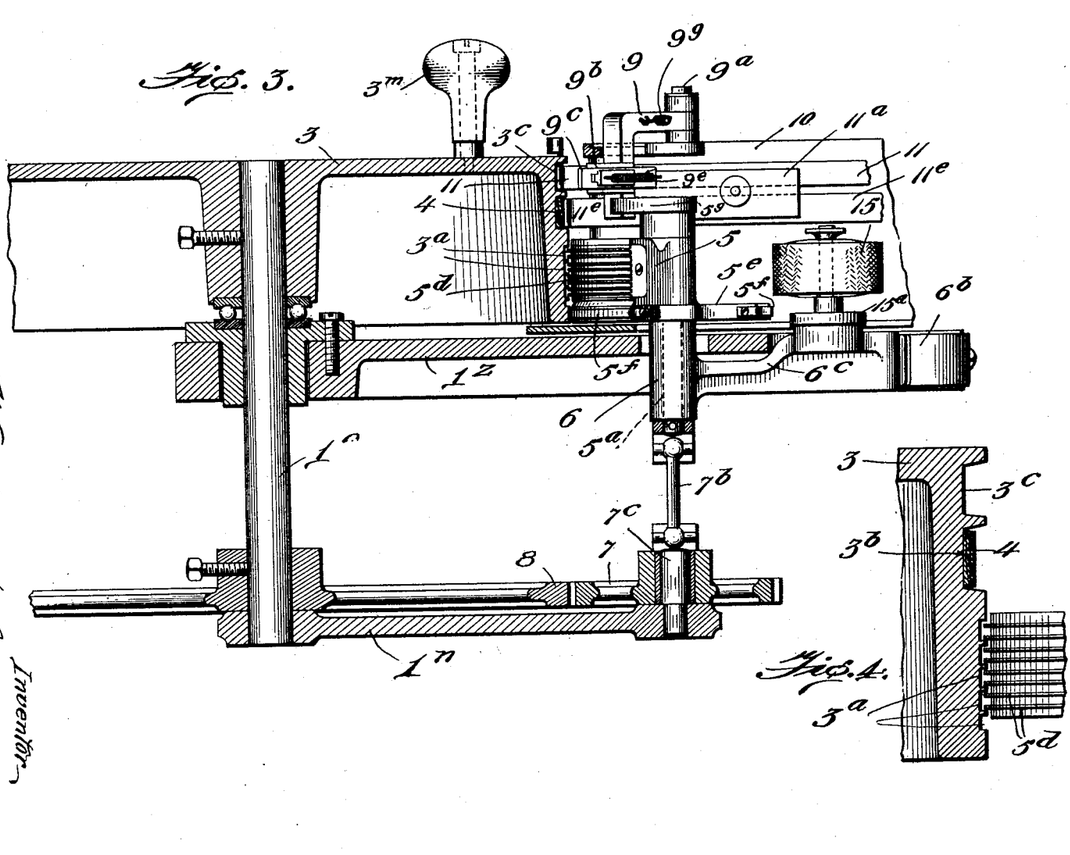
Fig. 3 is an enlarged detail vertical sectional view on line 3—3, Fig. 1.
Fig. 4 is an enlarged detail sectional view through one side of the drum, and showing the relation of the drum, belt, and printing member.
Figure 5:
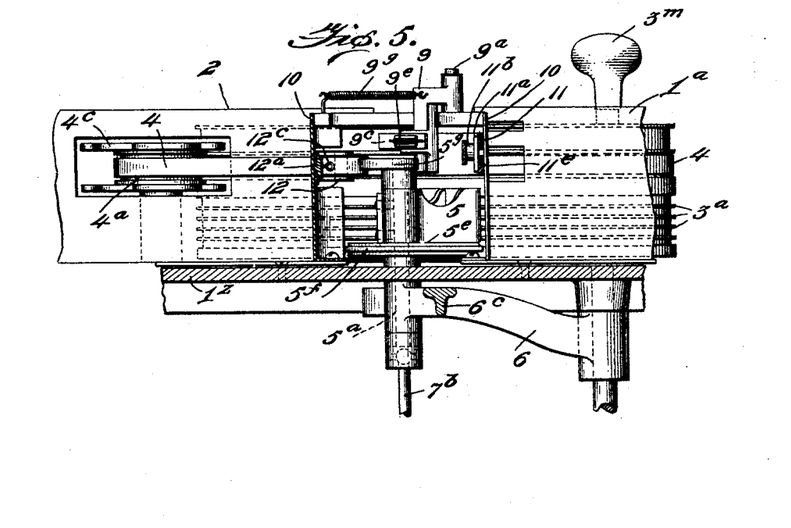
Figs. 5 and 6 are respectively vertical sectional views on lines 5—5 and 6—6, Fig. 1.
Figure 6:
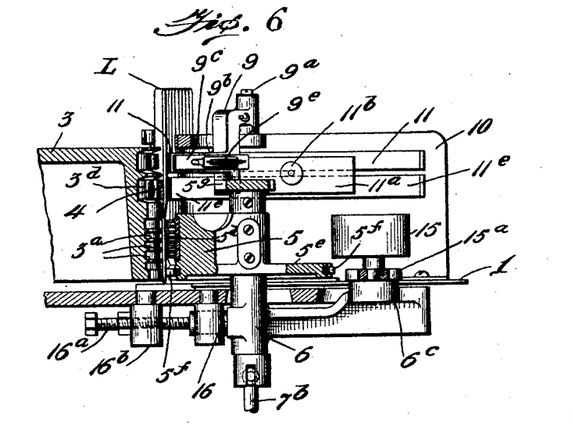

The cam 5$^g$ forces the arm 9 back to the position shown in Fig. 2 after the printing has been effected and holds it back until the printing member is ready to again begin printing. Then when a letter comes into position for printing cam 5$^g$ releases arm 9 and the latter is swung inwardly by means of a spring 9$^g$ connected to the arm and to the opposite side of the housing 10.

When arm 9 is in the position shown in Fig. 2 the stop 9$^c$ lies directly across the letter path, (see Fig. 2) remaining there until a projection on the drum 3 causes the feed belt 4 to move a letter into printing position, at which time the cam 5$^g$ releases the arm 9 and spring 9$^g$ swings the arm and stop inward and away from the letter path, permitting the letter to travel toward the delivery while nipped between the belt 4 and the canceling and marking die, or printing surface of the printing member and printing roll or drum. The arm 9 is returned to position by the cam as the printing member rotates, but in case of a long letter the stop 9$^c$ is permitted to yield and lightly press against the side of the letter without deterring it, until the tail of the letter passes it, then the spring 9$^e$ throws the sliding stop into position across the letter path as in Fig. 2, where it remains and prevents the passage of the next letter until the printing member has about completed a revolution and is ready for another printing operation.

The stop is drawn away from the letter path by spring 9$^g$ when permitted by cam 5$^g$, but normally this cam holds arm 9 in such position that stop 9$^c$ projects across the letter path. This stop corrects any inequalities in the spacing or separation between the successive letters, and insures that the front edge of a letter shall not come into the printing position before the printing surfaces are ready to print, and thus insures accurate similar impression on the letters or articles despite variations in length thereof.

After the forward edge of a letter has passed beyond the printing point the stop 9$^c$ will lightly slide thereon and slip off the tail of the letter and spring across the letter path into the groove 3$^c$ when the letter passes it.

The feed buttons or projections 3$^d$ on the drum successively cause the belt 4 to bite the letters and bring them successively into printing position at the proper time; but as to avoid or overcome slippage, due to thickness, heaviness or slippery character of different letters, I preferably arrange the feed buttons 3$^d$ so they will cause the belt 4 to move the letter into position a little ahead of the die, but the stop 9$^c$ holds the letter back until the printing surface on member 5 takes a firm bite on the entering edge of the letter, at which time cam 5$^g$ releases the arm 9 and the spring 9$^g$ causes the stop to move out of the way and permit the letter to travel forward through the machine.

In the machine shown in the drawings three feed buttons or projections 3$^d$ are shown, so that at each rotation of the drum three letters will be fed past the printing member; and the gearing between the drum and the printing member is such that the printing member will make three revolutions to one of the drum, each are so timed that the cam 5$^g$ releases the stop arm 9 as and when one of the projections 3$^d$ causes the belt to engage a letter and move it forward to the printing point; the letter being then positively nipped first between the belt and the separator and then between the printing surfaces and the drum; and after the printing the letter is carried forward by the action of the roller 12 and the belt 4, and by the action of the surface 5$^t$ and of the printing member and the drum.

The projections 3$^d$ are so far spaced apart around the periphery of the drum as to feed in the largest letter upon which the machine is intended to operate. Obviously the number of projections 3$^d$ employed can be varied according to the circumference of the drum and the length of the letters to be printed; but the gearing between the drum and the printing member should be so proportioned that the printing member performs one operation or revolution for each projection 3$^d$ on the drum during each revolution of the drum.

The die 5$^c$ and canceling bars 5$^d$ may be inked in any suitable manner. As shown they are supplied with ink by a felt roller 15 mounted on a stud on one end of a lever 15$^a$, which is pivoted on an extension 6$^c$ of arm 6; and the other end of lever 15$^e$ can be adjustably fastened to the extension 6$^c$ by means of a nut or screw 15$^b$; this permits the ink roller to be adjusted to or from the die and canceling bars and held in position to contact therewith, with any desired degree of pressure as the member 5 rotates.

The printing member, the controlling cam, and ink roller, are all preferably mounted on the yielding arm 6, but as the printing member is driven through a universal joint, said member can move back and forth to accommodate varied thicknesses of letters, and be firmly supported and positively driven while capable of yielding relative to the drum.

The drum 3 and belt 4 perform the functions of feeding and timing the letters; and the drum also performs the functions of an impression cylinder and driving wheel.

The inward movement of the member 5 with canceling bars and die can be limited by a suitable stop 16 attached to bolt 16$^a$ tapped through a stud 16$^b$ on the frame beneath the drum.

A separator rubber 11 may be mounted in the housing 10 at the side adjacent the feed table 1, and projects beyond the inner end of the housing toward the periphery of the drum 3 and against the belt 4. This separator may be adjustably fastened by a clamp plate 11$^a$ and screw 11$^b$ as shown.

The delivery table 2 may be provided with an article support or stacker slide 2$^b$ of any desired construction; and plate 2$^a$ may have a guide finger 2$^c$ the end of which projects into groove 3$^c$ and directs the articles onto the delivery table.

An auxiliary idler roller 12 is preferably provided intermediate the member 5 and the stacker. As shown this roller is supported on a slide 12$^a$ mounted on the side of the housing 10 adjacent the delivery table; and the said slide and roller are pressed inward toward the drum 3, so as to hold the roller yieldingly in contact with the belt 4, or interposed letter, by means of a spring 12$^c$.

Operation.

The parts are shown in normal position in Fig. 2 with the stop 9$^c$ projecting into the groove of the drum across the path of the letter L which it has arrested. In this figure one of the projections 3$^d$ is shown as just ready to engage a letter and the cam 5$^g$ is just ready to release the arm 9. Upon the further rotation of the drum cam 5$^g$ releases the arm 9 and the spring 9$^g$ swings said arm 9 so as to move stop 9$^c$ out of the path of the letter which is then nipped between the conceling bars or printing surface 5$^d$ on the printing member 5 and the drum, as shown in Fig. 1 and the forward edge of the letter is also nipped between the belt 4 and the roller 12.

By the time the printing member has almost made one complete revolution the letter has passed the printing point and the cam 5$^g$ returns the arm 9 to the position shown in Fig. 2 and the stop 9$^c$ springs to the position shown in Fig. 2, and prevents the next letter entering between the drum and the printing member until cam 5$^g$ again releases the arm 9.

The stop 9$^c$ is positively held in position to arrest a letter until the arm 9 is released by the cam 5$^g$ and this cam being attached and rotating with the printing member does not release the stop until the printing member is ready to begin another printing operation; and only one letter is permitted to pass between the printing member and the drum for each rotation of the printing member.

Each letter has to travel only slightly more than its length from the feed to the delivery and it moves in a practically straight line from the feed table to the delivery table in front of the stacker; and is not bent or deflected around the periphery of the drum. This short straight travel greatly facilitates the handling of the letters, and keeps them in better condition; and greatly accelerates the speed of the machine; and at the same time the feed and delivery are most conveniently accessible to the operator.

In this machine the point of separation of the letters, point of stoppage of the letters preparatory to printing and point of impression or printing contact are all approximately within less than one inch, with the result that the successive presentation of the letters and the printing or postmarking on the successive letters is more uniform and accurate. Where the separation is made at a point several inches away from the stop or printer it frequently happens that the letters that vary in thickness and texture arrive at the printing position in various times instead of at uniform times, with the result that thick letters might be only partially impressed because of their failure to arrive on time at the printing point, while thin letters would receive the full proper impression. My separator wiper co-acts with the moving feed belt or roller at a point very close to the stop, see Fig. 2. The letter is stopped almost as soon as it is separated and is advanced immediately and coincident with the beginning of the printing operation and each letter, whether thick or thin, receives the full proper stamp or impression.

What I claim is:

1. In combination, means for feeding a letter; means for printing the letter; a stop adapted to prevent the passage of another letter past the printing means until the preceding letter has passed and the printing means is ready to again operate; gearing between the feeding means and the printing means whereby the latter is caused to make one rotation or operation during the time each letter should be fed therepast; and a cam operating in unison with the printing means, whereby said stop is moved into position for effective operation during the printing operation on a letter and released after the printing operation; and means for withdrawing the stop to permit the forwarding of the next letter to the printing means when the latter is ready to begin another operation.

2. In a machine of the character described, a drum, a feed belt co-acting with the drum, and projections on the drum adapted to cause the contiguous portions of the belt when engaged by said projections to project, the projections engaging different portions of the feed belt at successive operations, substantially as described.

3. In a machine of the character described, a drum having a peripheral groove, a feed belt engaging in said groove and masked thereby, and projections in said groove adapted to cause the contiguous portions of the belt when engaged by said projections to project beyond the periphery of the drum, the projections engaging different portions of the feed belt at successive operations.

4. In a machine of the character described, a drum, and a feed belt co-acting with the drum, projections on the drum adapted to cause the contiguous portions of the belt when engaged by said projections to project beyond the periphery of the drum, the projections engaging different portions of the feed belt at successive operations; in combination with a printing member beside the drum, and gearing between the printing member and the drum whereby the printing member is caused to make one revolution for each projection on the drum during the revolution of the drum.

5. In a machine of the character described, a drum having a peripheral groove, a feed belt engaging in said groove and masked thereby, and projections in said groove adapted to cause the contiguous portions of the belt when engaged by said projections to project beyond the periphery of the drum, the projections engaging different portions of the feed belt at successive operations; in combination with a printing member beside the drum and gearing between the printing member and the drum whereby the printing member is caused to make one revolution for each projection on the drum during the revolution of the drum.

6. In combination a rotatable drum, a printing member beside and co-acting with the drum, gearing between the drum and printing member, a letter stop adjacent the printing member, mechanically actuated means for releasing said stop at the beginning of a printing operation and returning the stop to normal position after the printing; said stop being adapted to arrest the passage of a letter until a preceding letter has passed the printing member and the latter is ready to begin another printing operation, and a yieldable slidable member connected with said stop to permit the passage of extra long letters, substantially as described.

7. In combination a rotatable drum, a belt co-acting with said drum, and spaced projections on the drum for causing said belt to successively engage a letter to be printed, the projections engaging different portions of the feed belt at successive operations, a printing member beside and co-acting with the drum, and gearing between the drum and printing member whereby the latter is caused to operate once for each projection on the drum; a stop adjacent the printing member; mechanically actuated means for releasing said stop at the beginning of a printing operation and thereafter positively returning the stop to normal position; said stop being adapted to arrest the passage of a letter until a preceding letter has passed the printing member and the latter is ready to begin another printing operation.

8. In combination a rotatable drum, a belt co-acting with said drum, spaced projections on the drum for causing said belt to successively engage a letter to be printed upon, the projections engaging different portions of the feed belt at successive operations, a printing member beside and co-acting with the drum, and gearing between the drum and printing member whereby the latter is caused to make one operation for each projection on the drum; with a stop arm adjacent the printing member, mechanically actuated means for releasing said arm at the beginning of a printing operation and returning the arm to normal position; and a yieldable letter stop connected with said arm adapted to arrest the passage of a letter until a preceding letter has passed the printing member and the latter is ready to begin another printing operation.

9. In a machine of the character described, a drum, a feed belt co-acting with the drum, and a printing member beside the drum, and gearing between the printing member and the drum, a letter stop adjacent the printing member adapted to prevent a letter entering between the printing member and the drum, mechanically actuated means whereby the stop is withdrawn when the printing member is ready to begin an impression, and thereafter returned to arresting position, and a yieldable slidable member connected with said stop to permit the passage of extra long letters, substantially as described.

10. In a machine of the character described, a drum having a peripheral groove, a feed belt engaging said groove, projections in said groove adapted to cause the contiguous portions of the belt to project, the projections engaging different portions of the feed belt at successive operations; in combination with a printing member beside the drum, a gearing between the printing member and the drum whereby the printing member is caused to make one revolution for each projection on the drum during the revolution of the drum; a letter stop adjacent the printing member adapted to prevent a letter entering between the printing member and the drum and mechanically actuated means whereby the stop is released when the printing member is ready to make an impression and whereby the stop is returned to arresting position.

11. In a machine of the character described, a feed and impression drum, a feed belt co-acting with the drum, and projections on the drum adapted to cause the contiguous portions of the belt to project beyond the periphery thereof, the projections engaging different portions of the feed belt at successive operations; in combination with a printing member beside the drum; gearing between the printing member and the drum whereby the printing member is caused to make one revolution for each projection on the drum during each revolution of the drum; a yieldable letter stop adjacent the printing member adapted to prevent a letter entering between the printing member and the drum, means whereby the stop is withdrawn when the printing member is ready to begin an impression and a cam whereby the stop is returned to arresting position.

12. In a machine of the character described, a feed and impression drum having a peripheral groove, a feed belt operating in said groove and masked thereby, and projections in said groove adapted to cause the contiguous portions of the belt to project beyond the periphery of the drum, the projections engaging different portions of the feed belt at successive operations; in combination with a printing member beside the drum, gearing between the printing member and the drum whereby the printing member is caused to make one revolution for each projection on the drum during the revolution of the drum; a yieldable letter stop adjacent the printing member adapted to prevent a letter entering between the printing member and the drum, means whereby the stop is released when the printing member is ready to make an impression and a cam whereby the stop is returned to arrested position, substantially as described.

13. In combination, side by side feed and delivery tables; the discharge end of the delivery table being in line with the receiving end of the feed table and the printing point so located that letters may be fed in a straight line from the feed to the delivery table past the printing point; printing and impression members on opposite sides of the line of travel of the letter, and a mechanically actuated stop for preventing the passage of a letter past the printing mechanism until the latter is ready to begin a printing operation, with a feed belt extending from the feed table past the printer to the delivery table and adapted to move the letters from the feed table past the printer to the delivery, substantially as described.

14. In a machine of the character described the combination of means for moving a letter past the printing point, and a printing member adjacent said point; with a stop adjacent the printing member; means actuated by said printing member for releasing said stop at the beginning of a printing operation and thereafter returning the stop to normal position; said stop being adapted to arrest the passage of a letter until a preceding letter has passed the printing member and the latter is ready to begin another printing operation.

15. In a machine of the character described, the combination of means for feeding a letter past the printing point; a printing member adjacent said point; and means for rotating the printing member in timed relation with the feeding means; with a stop adjacent the printing member, means actuated by said printing member for releasing said stop at the beginning of a printing operation and returning the stop to normal position; said stop being adapted to arrest the passage of a letter until a preceding letter has passed the printing member and the latter is ready to begin another printing operation.

16. In a machine of the character described the combination of means for feeding a letter past the printing point, a printing member adjacent said point; and means for rotating the printing member in timed relation with the feeding means; with a stop arm adjacent the printing member, cam means for releasing said arm at the beginning of a printing operation and positively returning the arm to normal position; and a yieldable letter stop connected with said arm adapted to arrest the passage of a letter until a preceding letter has passed the printing member and the latter is ready to begin another printing operation.

17. In a machine of the character described the combination of means for feeding a letter past the printing point, a printing member adjacent said point; means for inking the printing member; with a stop arm adjacent the printing member, cam means for releasing said arm at the beginning of a printing operation and returning the arm to normal position, and a yieldable letter stop connected with said arm adapted to arrest the passage of a letter until a preceding letter has passed the printing member and the latter is ready to begin another printing operation.

18. In combination feeding and impression means, a printing member coöperating with the impression means, a swingable stop for arresting the letters prior to printing, and a cam connected with said printing member whereby said stop is moved into position for effective operation during the printing operation on a letter and released after the printing operation; and means for withdrawing the stop to permit the forwarding of the next letter to the printing means when the latter is ready to begin another operation; with a yieldable support carrying said printing member and cam whereby said printing member is yieldably movable as a unit toward or from the printing point to accommodate letters of varying thickness.

19. In a machine of the character described a rotatable feed and impression drum, a feed belt coacting with said drum, a printing member coöperating with the drum, and gearing for positively actuating said printing member from the drum, a stop for arresting the letters prior to printing, and a cam connected with said printing member whereby said stop is moved into position for effective operation during the printing operation on a letter and released after the printing operation; and means for withdrawing the stop to permit the forwarding of the next letter to the printing means when the latter is ready to begin another operation; with a yieldable support carrying said printing member whereby it is yieldably movable as a unit toward or from the printing point to accommodate letters of varying thickness.

20. In a machine of the character described, a rotatable feed and impression drum; a feed belt co-acting with said drum; a printing member coöperating with the drum; and gearing for positively actuating said printing member from the drum, with a stop for arresting the letters prior to printing; a cam connected with said printing member whereby said stop is moved into position for effective operation during the printing operation on a letter and released after the printing operation; and means for withdrawing the stop to permit the forwarding of the next letter to the printing means when the latter is ready to begin another operation; yieldable means for inking the printing member; a yieldable pivoted support carrying said printing member; whereby it is yieldably movable as a unit toward or from the printing point to accommodate letters of varying thickness.

21. In combination a rotatable drum; a printing member beside and coacting with the drum, a feed belt operated by the drum and adapted to move letters from the feed part of the printing member to the delivery; a letter stop adjacent the printing member; means for releasing said stop at the beginning of a printing operation and returning the stop to normal position after printing; and a wiper separator co-acting with the belt, the points of separating, stopping and printing being closely adjacent, said wiper being adapted to successively separate the letters, and said stop being adapted to arrest the passage of each letter until the preceding letter has passed the printing member and the latter is ready to begin another printing operation.

In testimony that I claim the foregoing as my own, I affix my signature.

WALTER H. BOWES.